(12) United States Patent
Mackay et al.

(10) Patent No.: US 11,411,763 B2
(45) Date of Patent: Aug. 9, 2022

(54) DUCKING AND ERASING AUDIO FROM NEARBY DEVICES

(71) Applicant: GOOGLE LLC, Mountain View, CA (US)

(72) Inventors: Kenneth John Mackay, Sunnyvale, CA (US); Nikita Gupta, Mountain View, CA (US); Tomer Shekel, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/176,126

(22) Filed: Feb. 15, 2021

(65) Prior Publication Data

US 2021/0167985 A1    Jun. 3, 2021

Related U.S. Application Data

(63) Continuation of application No. 16/114,812, filed on Aug. 28, 2018, now Pat. No. 10,958,467.

(Continued)

(51) Int. Cl.
*H04L 12/28* (2006.01)
*H04L 67/51* (2022.01)
(Continued)

(52) U.S. Cl.
CPC .......... *H04L 12/2821* (2013.01); *G06F 3/165* (2013.01); *G10L 15/22* (2013.01);
(Continued)

(58) Field of Classification Search
CPC . G06F 3/16–3/167; G10L 15/22–25/00; H04L 12/2814–12/2821; H04L 29/08648–29/08702; H04R 27/00–27/04
See application file for complete search history.

(56) References Cited

U.S. PATENT DOCUMENTS

| 8,375,137 B2 | 2/2013 | Bowman |
| 8,768,494 B1 | 7/2014 | Stroud et al. |

(Continued)

FOREIGN PATENT DOCUMENTS

| CN | 1397063 A | 2/2003 |
| CN | 105096959 A | 11/2015 |

(Continued)

OTHER PUBLICATIONS

Notification of First Office Action for Chinese Application No. 201880035354.6, dated May 24, 2021.

(Continued)

*Primary Examiner* — Clayton R Williams
(74) *Attorney, Agent, or Firm* — Byrne Poh LLP

(57) ABSTRACT

A smart home device (e.g., a voice assistant device) includes an audio control system that determines a set of one or more audio devices to include nearby devices that are capable of providing audio streams that are audibly detected by a microphone of the smart home device. The audio control system initiates a voice-interaction mode for operating the smart home device to receive voice commands from a user and provide audio output in response to the voice commands. The audio control system transmits an audio control signal to nearby devices that configures each nearby device to implement one or more of: reducing a volume level associated with the audio streams generated by the nearby devices while the smart home device is operating in the voice-interaction mode; and transmitting, to the smart home device, audio stream data associated with a current audio stream generated for audible output by the nearby device.

17 Claims, 5 Drawing Sheets

Related U.S. Application Data

(60) Provisional application No. 62/595,178, filed on Dec. 6, 2017.

(51) Int. Cl.
*G06F 3/16* (2006.01)
*G10L 15/22* (2006.01)
*H04R 27/00* (2006.01)
*G10L 17/00* (2013.01)

(52) U.S. Cl.
CPC .......... *G10L 17/00* (2013.01); *H04L 12/2814* (2013.01); *H04L 29/08648* (2013.01); *H04R 27/00* (2013.01); *H04L 2012/2849* (2013.01); *H04R 2227/003* (2013.01); *H04R 2227/005* (2013.01); *H04R 2430/01* (2013.01)

(56) References Cited

U.S. PATENT DOCUMENTS

| | | | |
|---|---|---|---|
| 8,774,955 | B2 | 7/2014 | Chen |
| 2014/0113551 | A1 | 4/2014 | Krishnan et al. |
| 2017/0083285 | A1 | 3/2017 | Meyers et al. |
| 2017/0242653 | A1 | 8/2017 | Lang et al. |
| 2017/0330566 | A1* | 11/2017 | Trott ................ G10L 15/30 |
| 2017/0332168 | A1* | 11/2017 | Moghimi ............ G10L 21/0208 |
| 2018/0190264 | A1 | 7/2018 | Mixter et al. |
| 2018/0352334 | A1* | 12/2018 | Family ................ H04R 5/04 |
| 2019/0066670 | A1 | 2/2019 | White et al. |

FOREIGN PATENT DOCUMENTS

| | | |
|---|---|---|
| CN | 105137937 | 12/2015 |
| CN | 105487396 | 4/2016 |
| CN | 105788599 | 7/2016 |
| WO | WO-2017/139533 A1 | 8/2017 |
| WO | WO-2017/147075 A1 | 8/2017 |

OTHER PUBLICATIONS

Dan Seifert, Amazon's voice-controlled Echo is now available to anyone that wants it , Jun. 23, 2015, pp. 1-2 (Year: 2015).

Benesty et al.. "A Better Understanding and an Improved Solution to the Specific Problems of Stereophonic Acoustic Echo Cancellation", IEEE Transactions on Speech and Audio Processing, vol. 6, No. 2, Mar. 1998, pp. 156-165.

Google LLC, International Search Report/Written Opinion, PCT/US2018/048258, 12 pgs.

Examination Report dated May 18, 2020 in EP Patent Application No. 18769930.1.

Extended European Search Report dated Jan. 24, 2022 in EP Patent Application No. 21202389.9.

Notice of Allowance dated Dec. 11, 2020 in U.S. Appl. No. 16/114,812.

Office Action dated May 8, 2020 in U.S. Appl. No. 16/114,812.

Office Action dated Sep. 4, 2020 in U.S. Appl. No. 16/114,812.

Office Action dated Nov. 15, 2021 in CN Patent Application No. 201880035354.6.

Summons to Attend Oral Proceedings dated Feb. 18, 2021 in EP Patent Application No. 18769930.1.

* cited by examiner

DUCKING AND ERASING AUDIO FROM NEARBY DEVICES

CROSS-REFERENCE TO RELATED APPLICATIONS

This application is a continuation of U.S. patent application Ser. No. 16/114,812, filed Aug. 28, 2018, which claims priority benefit of U.S. Provisional Application No. 62/595,178, filed Dec. 6, 2017.

All of the above-identified patent applications are incorporated herein by reference.

FIELD

The present disclosure relates generally to audio control systems. More particularly, the present disclosure relates to an audio control system for a primary computing device (e.g., a smart home device such as a voice assistant device) that coordinates ducking and/or erasing audio from nearby devices.

BACKGROUND

Some user computing devices are configured to operate in a variety of different input modes configured to obtain different categories of input from a user. For example, a device configured to operate in a keyboard mode can utilize a keyboard or touch-screen interface configured to receive text input from a user. A device configured to operate in a camera mode can utilize a camera configured to receive image input from a user. Similarly, a device configured to operate in a microphone mode can utilize a microphone to receive audio input from a user.

Some user computing devices configured to operate in a microphone mode can be more particularly designed to operate in a voice-interaction mode whereby two-way communication between a user and the device is enabled. More particularly, a device operating in voice-interaction mode can be configured to receive voice commands from a user and provide an audio response to the voice command. When a user is interacting with a device in such a manner, accurate recognition of the user's speech is critical for a good user experience. If other devices in the area are playing media (e.g., music, movies, podcasts, etc.), that background noise can negatively affect the speech recognition performance.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method. The method includes detecting, by a primary computing device, one or more secondary computing devices configured to generate audio streams for audible output in an environment, wherein the primary computing device and the one or more secondary computing devices are communicatively coupled via a network. The method also includes categorizing, by the primary computing device, at least one of the one or more secondary computing devices as a nearby device when such a secondary computing device is determined to be capable of providing audio streams that are audibly detected by the primary computing device. The method also includes initiating, by the primary computing device, a voice-interaction mode for operating the primary computing device to receive voice commands from a user and provide audio output in response to the voice commands. The method also includes transmitting, by the primary computing device to each nearby device, an audio signal that configures the nearby device to reduce a volume level associated with the audio stream generated by the nearby device while the primary computing device is operating in the voice-interaction mode.

Another example aspect of the present disclosure is directed to an audio control system for a primary computing device. The system includes one or more processors and one or more non-transitory computer-readable media that store instructions that when executed by the one or more processors cause the computing device to perform operations. The operations include obtaining audio stream data associated with current audio streams generated for audible output by one or more secondary computing devices, wherein the audio stream data is obtained by a primary computing device via a network. The operations also include obtaining a current audio sample received at the primary computing device, wherein the current audio sample is obtained by a microphone associated with the primary computing device. The operations also include modifying the current audio sample to reduce a portion of the current audio sample corresponding to the current audio streams generated for audible output by the one or more secondary computing devices. The operations also include detecting one or more voice commands within the modified current audio sample. The operations also include triggering an output of the primary computing device in response to detecting the one or more voice commands within the modified current audio sample.

Another example aspect of the present disclosure is directed to a voice assistant device, comprising a communications interface configured to establish wireless communication with one or more audio devices, a microphone configured to obtain current audio samples from an environment surrounding the voice assistant device, and an audio control system. The audio control system is configured to determine a set of the one or more audio devices to include nearby devices that are capable of providing audio streams that are audibly detected by the microphone of the voice assistant device. The audio control system is configured to initiate a voice-interaction mode for operating the voice assistant device to receive voice commands from a user and provide audio output in response to the voice commands. The audio control system is configured to transmit an audio control signal to the nearby devices that configures each nearby device to implement one or more of: reducing a volume level associated with the audio streams generated by the nearby devices while the voice assistant device is operating in the voice-interaction mode; and transmitting, to the voice assistant device, audio stream data associated with a current audio stream generated for audible output by the nearby device.

Other aspects of the present disclosure are directed to various systems, apparatuses, computer program products, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principle.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
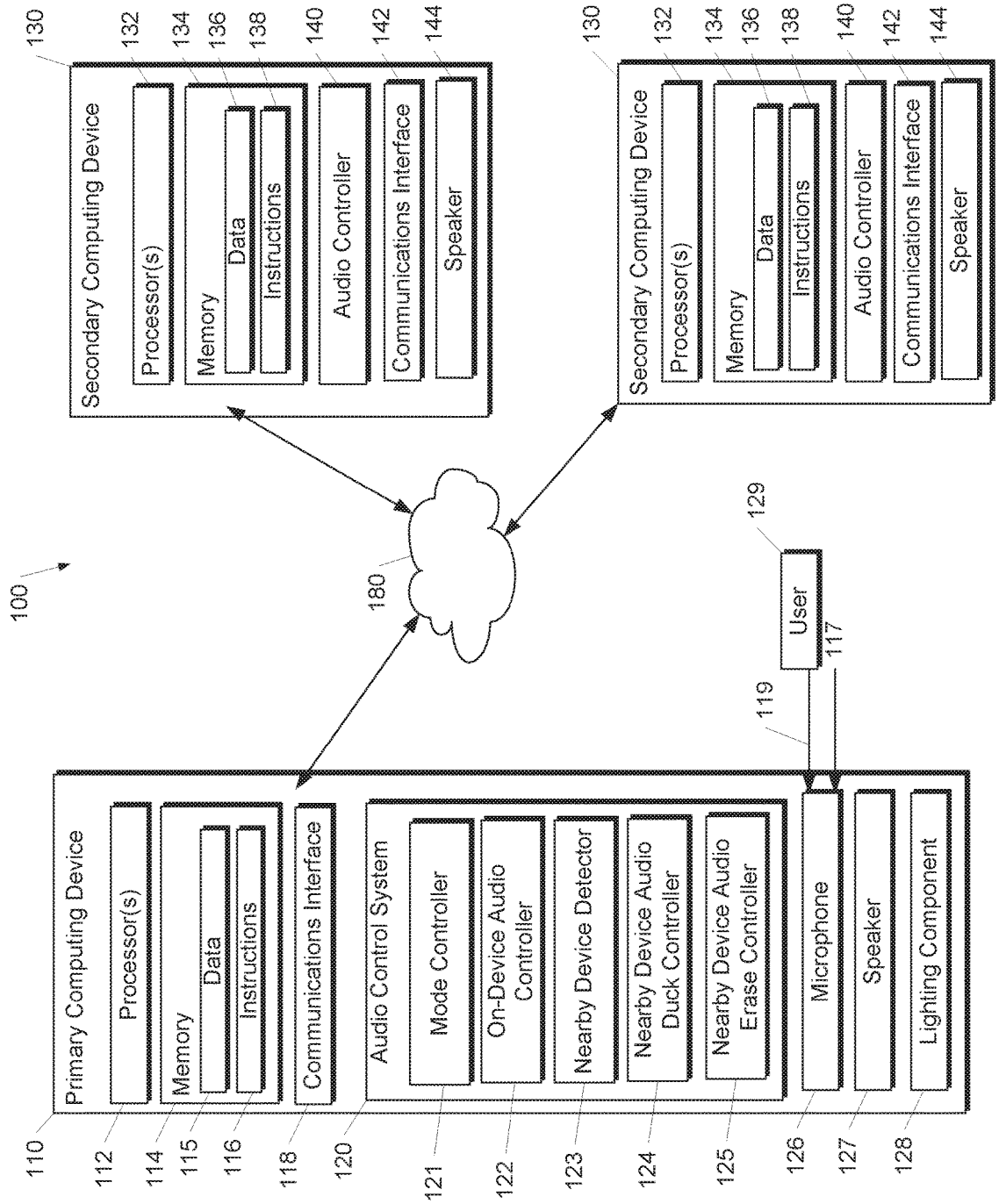
FIG. 1 depicts a block diagram of an example system including a primary computing device with an audio control system according to example embodiments of the present disclosure.

Generally, the present disclosure is directed to systems and methods for audio control within a networked collection of computing devices. In particular, the present disclosure is directed to an audio controller for a primary computing device (e.g., a smart home device, a voice assistant device, a smart speaker, a mobile device, a personal computing device) that can coordinate ducking and/or erasing audio streams from one or more secondary computing devices (e.g., smart audio devices, smart home devices, speakers, and the like). The audio controller of the primary computing device can determine which of the secondary computing devices is a nearby device capable of generating audio streams that are audibly detected by the primary computing device. The audio controller can then transmit an audio control signal to the nearby device(s). In some implementations, the audio control signal can comprise an audio signal (e.g., a ducking signal) that configures each nearby device to reduce a volume level associated with the audio streams generated by the nearby device(s) for a predetermined period of time (e.g., while the primary computing device is operating in a voice-interaction mode). Additionally or alternatively, the audio control signal can configure each nearby device to transmit, to the primary computing device, audio stream data associated with current audio streams generated for audible output by the nearby device. The audio controller can then modify a current audio sample obtained by the primary computing device to erase/reduce portions of the current audio sample corresponding to the current audio stream(s) generated for audible output by each of the nearby devices. By providing features for ducking and/or erasing audio from nearby devices, accurate recognition of a user's voice commands provided to the primary computing device can be improved, thus facilitating an improved user experience when initiating or engaging in a voice-interaction mode.

More particularly, a primary computing device in accordance with the disclosed technology can be configured to function as a smart home device, a voice assistant device, a smart speaker, a mobile device, a personal computing device, or the like. In some implementations, the primary computing device can include one or more components including but not limited to a microphone, a speaker, a lighting component, a communications interface, a voice assistant application, and an audio control system.

In some implementations, the microphone of the primary computing device can be configured to obtain current audio samples from an environment surrounding the primary computing device from which one or more voice commands can be detected. The speaker can be configured to provide audio output generated by the primary computing device in response to the voice commands. For example, if the detected voice command included a user saying the words "What is the weather?", then the audio output generated by the device and provided as output to the speaker can include an audio message corresponding to "The current weather in Virginia Beach is 70 degrees with partly cloudy skies." In another example, if the detected voice command included a user saying the words "Play music by Bob Marley," then the audio output generated by the device and provided as output to the speaker can include audio content corresponding to songs by the requested artist. In some implementations, the speaker and/or the lighting component (e.g., an LED device) can be activated as an audio/visual output of the primary computing device in response to detecting one or more voice commands (e.g., in response to detecting a hotword).

In some implementations, the communications interface of the primary computing device can be configured to establish wireless communication over a network with one or more secondary computing devices (e.g., smart audio devices including but not limited to smart speakers, smart televisions, smartphones, mobile computing devices, tablet computing devices, laptop computing devices, wearable computing devices and the like). For example, the primary computing device can be a voice assistant device while the secondary computing devices can include one or more smart televisions and smart speakers. In some implementations, the primary computing device and secondary computing device(s) that are communicatively coupled via a network respectively include a built-in casting platform that enables media content (e.g., audio and/or video content) to be streamed from one device to another on the same local network. The communications interface can include any suitable hardware and/or software components for interfacing with one or more networks, including for example, transmitters, receivers, ports, controllers, antennas, or other suitable components. The network can be any type of communications network, such as a local area network (e.g. intranet), wide area network (e.g. Internet), cellular network, wireless network (e.g., Wi-Fi, Bluetooth, Zigbee, NFC, etc.) or some combination thereof.

More particularly, in some implementations, the audio control system of the primary computing device can include one or more processors and one or more non-transitory computer-readable media that store instructions that, when executed by the one or more processors, cause the computing device to perform operations. The audio control system can be configured to detect nearby devices and transmit an audio control signal to the nearby devices that configures each nearby device to implement one or more audio actions associated with audio ducking and/or erasing. In general, audio ducking can correspond to a configuration in which nearby devices play more quietly or stop playback while a primary computing device is operating in voice-interaction mode. In general, audio erasing can correspond to a configuration in which a primary computing device can erase or reduce nearby device audio from audio samples obtained by a microphone of the primary computing device. Audio erasing can occur before initiation of a voice-interaction mode (e.g., during hotword detection) and/or during voice-interaction mode. In some implementations, the audio control system can include a mode controller, an on-device audio controller, a nearby device detector, a nearby device audio duck controller, and/or a nearby device audio erase controller.

In accordance with another aspect of the disclosed technology, a mode controller within an audio control system of a primary computing device can be configured to coordinate with a voice assistant application accessible at the primary computing device. In some implementations, the mode controller can initiate a voice-interaction mode for operating the voice assistant device to receive voice commands from a user and provide output in response to the voice commands. For example, a button provided at the primary computing device can be pressed by a user or a voice command from a user can be received by a microphone of the primary computing device and analyzed to determine if it matches a predetermined mode initiation command (e.g., "OK Smart Device"). The voice-interaction mode for operating the primary computing device can be initiated in response to receiving the voice command from the user that is determined to match the mode initiation command. Outputs generated and provided by the primary computing device in response to detection of a mode initiation command can include, for example, illumination of a lighting component, activation of an audio component (e.g., playing a beep, chirp, or other audio sound associated with initiation of the voice-interaction mode).

After the primary computing device is configured to operate in the voice-interaction mode, the primary computing device can detect one or more voice commands within a current audio sample obtained by a device microphone and trigger an output of the device. Device outputs can include, for example, providing an audio response, transmitting a media control signal directing a secondary computing device to stream media content identified by the voice command, etc. In some implementations, during operation in the voice-interaction mode, an audio control signal periodically communicated from the primary computing device to nearby devices can reduce a volume level associated with the audio streams generated by the nearby devices, thus improving detection of voice commands by the primary computing device. In some implementations, during operation in the voice-interaction mode, an audio control signal can use audio stream data associated with one or more current audio streams generated for audible output by each nearby device to perform acoustic echo cancellation on a current audio sample obtained by the primary computing device, thus providing an additional or alternative technique for improving detection of voice commands by the primary computing device.

In accordance with another aspect of the disclosed technology, an on-device audio controller within an audio control system of a primary computing device can be configured to duck and/or erase audio generated by the primary computing device. For example, an on-device audio controller can be configured to reduce a volume level associated with audio output by the primary computing device while the primary computing device is operating in the voice-interaction mode.

In accordance with another aspect of the disclosed technology, a nearby device detector associated with a primary computing device can be configured to determine a set of one or more secondary computing devices (e.g., smart audio devices communicatively coupled via a network to the primary computing device) that are capable of providing audio streams that are audibly detected by the microphone of the primary computing device. Audible detection can correspond, for example, to detection of a given audio stream associated with a secondary computing device above a predetermined threshold level (e.g., threshold decibel level). Selective determination of which secondary computing devices are considered nearby devices can be important. Dynamic determination of a secondary computing device as a nearby device for audio ducking applications can prevent scenarios whereby a user is speaking to a voice assistant device at one end of the house and audio is ducked on a secondary networked device at the other end of the house. Dynamic determination of a secondary computing device as a nearby device for audio erasing applications can advantageously improve processing power and transmission efficiency among networked devices, especially in transmitting audio streams from secondary computing devices to a primary computing device.

More particularly, in some implementations, a nearby device detector can use a location configuration to determine which secondary computing devices are considered nearby devices. For example, computing devices operating over a local area network (e.g., the primary computing device and one or more secondary computing devices) can include an application (e.g., a built-in casting application) that provides a user interface for a user to specify a location identifier for each computing device. For example, a user can specify in which room in a building the device is physically positioned. For instance, a user can specify that a smart home device is set up for operation in a den, kitchen, bedroom, office, basement, family room, library, porch, or any other room or designated space within the user's home. Each room or other designated space can correspond to the location identifiers. When a location identifier for a secondary computing device is determined to match a location identifier for the primary computing device, then that secondary computing device can be determined to be a nearby device.

More particularly, in some implementations, a nearby device detector can use a grouping configuration to determine which secondary computing devices are nearby devices. For example, computing devices operating over a local area network (e.g., the primary computing device and one or more secondary computing devices) can include an application (e.g., a built-in casting application) that provides a user interface for a user to assign one or more devices into an identified group. For example, a user can specify that multiple devices belonging to one user are assigned to a group entitled "Mark's Devices." When a secondary computing device is determined to be assigned to a same group as the primary computing device, then that secondary computing device can be determined to be a nearby device.

More particularly, in some implementations, a nearby device detector can use an audio-based detection configuration to determine which secondary computing devices are nearby devices. In a first audio-based detection configuration, media focus can be used to identify a secondary computing device as a nearby device when a voice command provided to a primary computing device requests for content to be streamed to that secondary computing device. For example, if a user provided a voice command to a primary computing device requesting to play video content on a given secondary computing device, that secondary computing device can be considered a nearby device.

Additionally or alternatively, a second audio-based detection configuration can use the microphone of a primary computing device to detect nearby devices. Whenever a secondary computing device is playing audio, it can send some of the audio (e.g., encoded audio stream data associated with the audio) to the primary computing device. The microphone can be configured to obtain a current audio sample received at the primary computing device. The primary computing device determines whether or not it can hear the secondary computing device by comparing the current audio sample to the audio streams currently being played by each secondary computing device. When such comparison results in alignment of corresponding audio, then that secondary computing device can be determined to be a nearby device. This approach has an advantage that it only uses the existing playing audio. There are no issues with trying to detect an audio signal from a device that is turned off, and there is no need to correct for different volume levels across devices.

In some implementations, to facilitate implementation of the second audio-based detection configuration described above, a primary computing device can also obtain a timestamp associated with the current audio streams generated for audible output by each of the one or more secondary computing devices. In some implementations, each audio packet sent from a secondary computing device to a primary computing device includes such a timestamp. A clock offset between a system clock associated with the primary computing device and system clocks associated with each of the one or more secondary computing devices can be determined using the obtained timestamp(s). The clock offset can be used at least in part to compare and/or align the current audio streams generated for audio output by each of the one or more secondary computing devices to the current audio sample received by the microphone of the primary computing device. The clock offset can be used, for example, in determining an alignment window for comparing audio from secondary computing devices relative to a primary computing device. Determination of an alignment window can be especially useful when timestamps include inaccuracies due to hardware output delays or other phenomena.

More particularly, in some implementations, a nearby device detector can use a signaling configuration to determine which secondary computing devices are nearby devices. For example, categorizing a secondary computing device as a nearby device can include determining that a remote signal (e.g., an audio signal containing a device-specific code identifying the secondary computing device) is received by the primary computing device. For example, when a secondary computing device is playing audio content, it can also be configured to periodically (e.g., once every 30 seconds) send a remote signal (e.g., a Dual-Tone Multi-Frequency (DTMF) signal) containing a device-specific code. In some implementations, the device-specific code can be generated from the device's IP address. The primary computing device can then listen for the remote signals in the current audio samples obtained by its microphone. If the remote signal associated with a given secondary computing device is detected, that secondary computing device can be categorized as a nearby device. A remote signal can use different signaling protocols, for example, a Bluetooth Low Energy (BLE) protocol, a Direct-Sequence Spread Spectrum (DSSS) protocol, a Binary Phase-Shift Keying (BPSK) protocol, or other short-range wireless protocol can be used in accordance with the signaling configuration for determining nearby devices. This option would be helpful, especially when secondary computing devices are not currently streaming audio content.

There are several advantages to the signaling configuration approach described above. For example, there is an advantageous correlation between the disclosed signaling configuration and audio detection configuration techniques for determining nearby devices. More particularly, if a device-specific remote audio signal is output by a given secondary computing device at a volume proportional to the actual audio volume, detection of the device-specific remote audio signal by a primary computing device likely infers that the actual audio output is also detectable by the primary computing device. The approach of using a signaling configuration approach also generally requires little computational cost. In addition, the remote signal advantageously includes a built-in identifier for each secondary computing device from which a device-specific remote signal is received.

In accordance with another aspect of the disclosed technology, a nearby device audio duck controller within an audio control system of a primary computing device can be configured to control a reduction in volume, stopping and/or pausing of audio playback by one or more nearby devices. For example a primary computing device can be configured to transmit an audio ducking signal to nearby device(s) that configures the nearby device(s) to reduce a volume level associated with audio streams generated by the nearby device(s) while the primary computing device is operating in a voice-interaction mode. In some implementations, the audio ducking signal is sent to one or more nearby devices upon a primary computing device ducking its own audio streams by reducing a volume, stopping or pausing such audio streams generated for audible output by the primary computing device.

In some implementations, e.g., when an audio ducking signal commands a nearby device to reduce a volume level associated with current audio play, an output volume of each nearby device can be reduced by a predetermined amount (e.g., 30 dB). In some implementations, audio ducking signals can control nearby devices to reduce their respective volume levels by variable amounts based on a current volume for each nearby device as detected by a microphone of the primary computing device. In some implementations, audio ducking signals can specify particular ducking actions based on an application running at each nearby device (e.g., pause video content streaming from a video-sharing application, reduce volume level of audio content streaming from an audio-sharing application, etc.).

In some implementations, the nearby device audio duck controller can be further configured to transmit an audio unducking signal to nearby device(s) that configures the nearby device(s) to return to a previous volume level or to resume playback of audio/video content after the primary computing device is finished operating in the voice-interaction mode. In some implementations, the audio unducking signal is sent to one or more nearby devices upon a primary computing device unducking its own audio streams by returning audio/video to a previous volume or resuming playback of audio/video content at the primary computing device.

In some implementations, audio ducking signals and/or audio unducking signals communicated by a primary computing device can include an identifier associated with the primary computing device. When a secondary computing device receives a ducking signal, it can add it to a map of currently active duck requests keyed by each requesting device's identifier. When the same secondary computing device receives an unducking signal, it can remove the corresponding ducked device from the map. As long as there is one or more active ducking signals, the receiving computing device will remain ducked.

In some implementations, a ducking signal can only remain on a map for a predetermined timeout period (e.g., t=5 seconds) before automatically timing out and dropping off the map of currently active duck requests. This helps a device from staying in a ducked configuration even after dropping off a network of associated devices. When audio ducking signals are configured to time out at a nearby device, it may be desirable to periodically transmit an audio ducking signal from a primary computing device to a secondary computing device. For instance, an audio ducking signal can be periodically transmitted at intervals of time dependent on the predetermined timeout period (e.g., t/2, or 2.5 seconds when t=5 seconds as in the above example).

In accordance with another aspect of the disclosed technology, a nearby device audio erase controller within an audio control system of a primary computing device can be configured to control modification of a current audio sample to reduce a portion of the current audio sample corresponding to the current audio streams generated for audible output by each of the one or more nearby secondary computing devices. For example, when a primary computing device sets up a persistent control connection to a nearby device (for ducking), it can also request streamed audio data from that nearby device. Once this is done, whenever the nearby device is playing audio, it can be configured to transmit audio stream data associated with the audio to the primary computing device. This enables the primary computing device to erase the nearby device's audio from its microphone input.

Nearby device audio streams can be erased from a current audio sample to facilitate hotword detection and/or to improve operation during voice-interaction mode after hotword detection. More particularly, in some implementations, modifying a current audio sample is implemented before initiating voice-interaction mode for operating a primary computing device such that the current audio sample has a reduced audio contribution from each nearby device before being analyzed for detection of a predetermined mode initiation command. In other implementations, modifying a current audio sample is implemented after initiating voice-interaction mode for operating the primary computing device such that the current audio sample has a reduced audio contribution from each nearby device before being analyzed to determine voice commands from a user while operating in the voice-interaction mode.

Audio stream data relayed from a nearby device to a primary computing device can include the same file format or a different file format relative to the audio file played at the nearby device. For example, audio stream data can include a copy of decrypted data for play by the nearby device, an encoded/encrypted version of the audio stream (e.g., MP3 data, UDP data packets, data encoded using an audio codec such as PCM, Opus, etc.) Sending encoded data between devices can sometimes advantageously reduce the bandwidth of communicated audio stream data required to implement the disclosed audio erasing techniques.

In some implementations, the nearby device audio erase controller can align the audio streams being currently played by nearby devices with a current audio sample obtained at the microphone of a primary computing device. In some implementations, initial alignment of each audio stream can be configured to run on a low priority processing thread so as not to negatively affect other tasks. If an initial alignment fails, the audio erase controller can skip ahead in the audio stream and try again a few seconds later, potentially implementing an exponential backoff. In some implementations, to save bandwidth, each nearby device can send only short segments of audio stream data with which to align until alignment actually succeeds.

In some implementations, the nearby device audio erase controller can also erase audio contributed from the primary computing device itself. In such instance, the one or more secondary computing devices include the primary computing device such that modifying the current audio sample reduces the portion of the current audio sample corresponding to the current audio stream generated for audible output by the primary computing device.

In some implementations, the nearby device audio erase controller can implement additional coordination when multiple nearby devices are operating relative to a primary computing device. Such additional coordination can help address potential issues associated with bandwidth requirements for all audio streams from multiple such nearby devices. For example, if there are many nearby devices playing (or, many voice assistants near a single playing device), there will be many audio streams being sent over a network. In addition, erasing many different streams can burden the processing capacity of the primary computing device.

In some implementations, potential bandwidth issues can be mitigated by identifying when group casting by multiple nearby devices including a leader device and one or more follower devices is being implemented (e.g., in a multi-room playback application). In such applications, the nearby device audio erase controller can then request audio stream data from only the leader device. Additionally or alternatively, if there are many non-grouped nearby devices playing audio content, the primary computing device can prioritize erasing audio streams from the loudest device(s), and not request audio from the other devices. This can be done by initially requesting data from all devices, and determining the effective loudness, either from the ultrasonic checking at different volume levels, or by checking how much effect erasing each stream has on the current audio sample obtained by a microphone of the primary computing device. Nearby devices whose audio streams don't have much effect could then be ignored.

The systems and methods of the present disclosure provide a number of technical effects and benefits. As one example technical effect and benefit, the operation of a smart home device (e.g., a voice assistant device, a smart speaker, a mobile device, etc.) configured to operate in a voice-interaction mode can be significantly improved. A critical part of the operational accuracy and user experience for such devices involves an ability to selectively process (e.g., ignore or reduce) background noise received upon receipt of a mode initiation command (e.g., a hotword command) or another voice command. By providing an audio control system configured to transmit audio control signals from a primary computing device to one or more secondary computing devices within an environment, features can be provided that facilitate ducking and/or erasing of audio streams contributed by the secondary computing devices to a current audio sample captured at the primary computing device (e.g., by a microphone of the primary computing device). The ability to duck and/or erase audio from other nearby devices provides an ability to increase the accuracy of voice commands received by the microphone of the primary computing device. Increased accuracy of received voice commands can directly improve the effectiveness of the smart home device in providing an output in response to the voice commands.

The present disclosure further addresses a technical problem relating to selective application of audio ducking and/or audio erasing technology. More particularly, some systems and methods of the presently disclosed technology dynamically determine a subset of secondary computing devices in an environment associated with a primary computing device for which audio control (e.g., audio ducking and/or erasing technology) is implemented. It is important in some implementations that audio control is only applied to nearby devices, (e.g., devices capable of generating audio streams that are audibly detected by the primary computing device) so that user experience with such devices is not frustrated. For example, if a user is speaking to a voice assistant device at one end of the house, it may be undesirable to duck audio on a secondary networked device at the other end of the house. Such a broadly applied implementation of ducking could reduce the enjoyment of the secondary computing device user at the other end of the house without providing significant improvement to voice interaction by a user of the voice assistant device. Similarly, trying to erase audio from distant devices would undesirably use extra CPU cycles and network bandwidth without a noticeable improvement in voice recognition. By providing features for selectively ducking and/or erasing audio from only nearby devices, a positive user experience for a primary computing device (e.g., a voice assistant device) as well as a positive user experience for nearby secondary computing devices can be achieved.

Another technical effect and benefit of the disclosed technology is the ability to improve the ability of a smart home device in initiating a voice-interaction mode. Typically a user's interaction with a smart home device configured to operate in a voice-interaction mode is triggered by receipt of a mode initiation command (e.g., a hotword) corresponding to a predetermined word or phrase spoken by a user and detected by the device. Since the mode initiation command must be detected before the voice-interaction mode can be initiated, hotword detection is more likely improved by audio erasing technology. For example, the smart home device can obtain audio streams played by one or more nearby devices as well as timestamps for those audio streams. The smart home device can then modify current audio streams obtained by a microphone to reduce the contribution from nearby devices (e.g., using acoustic echo cancellation), resulting in better hotword detection performance. By compensating for nearby devices that can add playback noise to current audio samples, hotword detection performance can be improved thus improving the overall user experience for smart home devices.

With reference now to the Figures, example embodiments of the present disclosure will be discussed in further detail.

Example Devices and Systems

FIG. 1 depicts a block diagram of an example system 100 including a primary computing device 110 with an audio control system 120 according to example embodiments of the present disclosure. Primary computing device 110 can be configured to function as a smart home device, a voice assistant device, a smart speaker, a mobile device, a personal computing device, or the like. Primary computing device 110 can include one or more processors 112, a memory 114, a communications interface 118, an audio control system 120, a microphone 126, a speaker 127, and a lighting component 128.

More particularly, the one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data and instructions which are executed by the processor 112 to cause the primary computing device 110 to perform operations. The primary computing device 110 can also include a communications interface 118 that enables communications over one or more networks (e.g., network 180).

More particularly, in some implementations, the audio control system 120 of the primary computing device 110 can include one or more processors and one or more non-transitory computer-readable media that store instructions that, when executed by the one or more processors, cause the computing device to perform operations. The audio control system 120 can be configured to detect nearby devices (e.g., a set of secondary computing devices 130) and transmit an audio control signal to the nearby devices that configures each nearby device to implement one or more audio actions associated with audio ducking and/or erasing. In general, audio ducking can correspond to a configuration in which nearby devices play more quietly or stop playback while a primary computing device is operating in voice-interaction mode. In general, audio erasing can correspond to a configuration in which a primary computing device can erase or reduce nearby device audio from audio samples obtained by a microphone of the primary computing device. Audio erasing can occur before initiation of a voice-interaction mode (e.g., during hotword detection) and/or during voice-interaction mode. In some implementations, the audio control system 120 can include a mode controller 121, an on-device audio controller 122, a nearby device detector 123, a nearby device audio duck controller 124, and/or a nearby device audio erase controller 125.

In some implementations, the microphone 126 of the primary computing device 110 can be configured to obtain current audio samples 117 from an environment surrounding the primary computing device 110. In some implementations, the current audio samples 117 can include one or more voice commands 119 from a user 129. In some implementations, the current audio samples can also include audio streams provided as audible output from one or more secondary computing devices (e.g., secondary computing devices 130).

In some implementations, the speaker 127 of the primary computing device 110 can be configured to provide audio output generated by the primary computing device 110 in response to the voice commands 119. For example, if a detected voice command 119 includes a user saying the words "What is the weather?", then the audio output generated by the primary computing device 110 and provided as output to the speaker 127 can include an audio message corresponding to "The current weather in Virginia Beach is 70 degrees with partly cloudy skies." In another example, if a detected voice command 119 includes a user saying the words "Play music by Bob Marley," then the audio output generated by the primary computing device 110 and provided as output to the speaker 127 can include audio content corresponding to songs by the requested artist. In some implementations, the speaker 127 and/or the lighting component 128 (e.g., an LED device) can be activated as an audio/visual output of the primary computing device 110 in response to detecting one or more voice commands 119 (e.g., in response to detecting a hotword).

In some implementations, the communications interface 118 of the primary computing device 110 can be configured to establish wireless communication over a network 180 with one or more secondary computing devices 130 (e.g., smart audio devices including but not limited to smart speakers, smart televisions, smartphones, mobile computing devices, tablet computing devices, laptop computing devices, wearable computing devices and the like). For example, the primary computing device 110 can be a voice assistant device while the secondary computing devices 130 can include one or more smart televisions and smart speakers.

In some implementations, the primary computing device 110 and secondary computing device(s) 130 that are communicatively coupled via a network 180 respectively include a built-in casting platform that enables media content (e.g., audio and/or video content) to be streamed from one device to another on the same local network 180. The communications interface 118 can include any suitable hardware and/or software components for interfacing with one or more networks, including for example, transmitters, receivers, ports, controllers, antennas, or other suitable components. The network 180 can be any type of communications network, such as a local area network (e.g. intranet), wide area network (e.g. Internet), cellular network, wireless network (e.g., Wi-Fi, Bluetooth, Zigbee, NFC, etc.) or some combination thereof.

FIG. 1 depicts two secondary computing devices 130, although it should be appreciated that any number of one or more secondary computing devices can be communicatively coupled to primary computing device 110 via network 180. Each secondary computing device 130 of FIG. 1 can include one or more processors 132, a memory 134, an audio controller 140, a communications interface 142 and a speaker 144.

More particularly, the one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data and instructions which are executed by the processor 132 to cause the secondary computing device 130 to perform operations. Each secondary computing device 110 can also include a communications interface 142 that is similar to the communications interface 118 and enables communications over one or more networks (e.g., network 180).

Referring still to secondary computing devices 130, each speaker 144 is configured to provide audio output corresponding to one or more audio streams played by the secondary computing device 130. Audio controller 140 can be configured to control a volume level associated with the audio streams played via speaker 144, such as by reducing a volume level of the audio output by speaker 144 when primary computing device 110 is operating in a voice-interaction mode. Audio controller 140 can also be configured to relay audio stream data (e.g., encoded versions of audio streams played via speaker 144) from each secondary computing device 130 to primary computing device 110 so that audio erasing techniques can be applied to a current audio sample 117 obtained by the primary computing device.

Referring again to the primary computing device 110, a mode controller 121 within an audio control system 120 of the primary computing device 110 can be configured to coordinate with a voice assistant application accessible at the primary computing device 110. In some implementations, the mode controller 120 can initiate a voice-interaction mode for operating the primary computing device 110 to receive voice commands 119 from a user 129 and provide output in response to the voice commands 119. For example, a button provided at the primary computing device 110 can be pressed by a user or a voice command 119 from a user 129 can be received by a microphone 126 of the primary computing device 110 and analyzed to determine if it matches a predetermined mode initiation command (e.g., "OK, Smart Device"). The voice-interaction mode for operating the primary computing device 110 can be initiated in response to receiving the voice command 119 from the user 129 that is determined to match the mode initiation command. Outputs generated and provided by the primary computing device 110 in response to detection of a mode initiation command can include, for example, illumination of a lighting component 128, activation of an audio component such as speaker 127 (e.g., playing a beep, chirp, or other audio sound associated with initiation of the voice-interaction mode).

After the primary computing device 110 is configured to operate in the voice-interaction mode, the primary computing device 110 can detect one or more voice commands 119 within a current audio sample 117 obtained by a device microphone 126 and trigger an output of the primary computing device 110. Device outputs can include, for example, providing an audio response via speaker 127, transmitting a media control signal directing a secondary computing device 130 to stream media content identified by the voice command 119, etc. In some implementations, during operation in the voice-interaction mode, an audio control signal periodically communicated from the primary computing device 110 to nearby devices (e.g., secondary computing devices 130) can reduce a volume level associated with the audio streams generated by the nearby devices (e.g., audio streams played over speakers 144/164), thus improving detection of voice commands 119 by the primary computing device 110. In some implementations, during operation in the voice-interaction mode, an audio control signal can use audio stream data associated with one or more current audio streams generated for audible output by each nearby device to perform acoustic echo cancellation on a current audio sample 117 obtained by the primary computing device 110, thus providing an additional or alternative technique for improving detection of voice commands 119 by the primary computing device 110.

In accordance with another aspect of the disclosed technology, an on-device audio controller 122 within an audio control system 120 of a primary computing device 110 can be configured to duck and/or erase audio generated by the primary computing device 110. For example, an on-device audio controller 122 can be configured to reduce a volume level associated with audio output by the primary computing device 110 (e.g., audio played via speaker 127) while the primary computing device 110 is operating in the voice-interaction mode.

In accordance with another aspect of the disclosed technology, a nearby device detector 123 associated with a primary computing device 110 can be configured to determine a set of one or more secondary computing devices 130 that are capable of providing audio streams that are audibly detected by the microphone 126 of the primary computing device 110. Audible detection can correspond, for example, to detection of a given audio stream associated with a secondary computing device 130 above a predetermined threshold level (e.g., a threshold decibel level). Selective determination of which secondary computing devices 130 are considered nearby devices can be important. Dynamic determination of a secondary computing device 130 as a nearby device for audio ducking applications can prevent scenarios whereby a user is speaking to a voice assistant device at one end of the house and audio is ducked on a secondary networked device at the other end of the house. Dynamic determination of a secondary computing device 130 as a nearby device for audio erasing applications can advantageously improve processing power and transmission efficiency among networked devices, especially in transmitting audio streams from secondary computing devices 130 to primary computing device 110.

More particularly, in some implementations, a nearby device detector 123 can use a location configuration to determine which secondary computing devices 130 of FIG. 1 are considered nearby devices. Aspects of such configuration can be appreciated from the block diagram of an example system 200 of networked computing devices (e.g., 110, 130 *a-d*).

Figure 2:
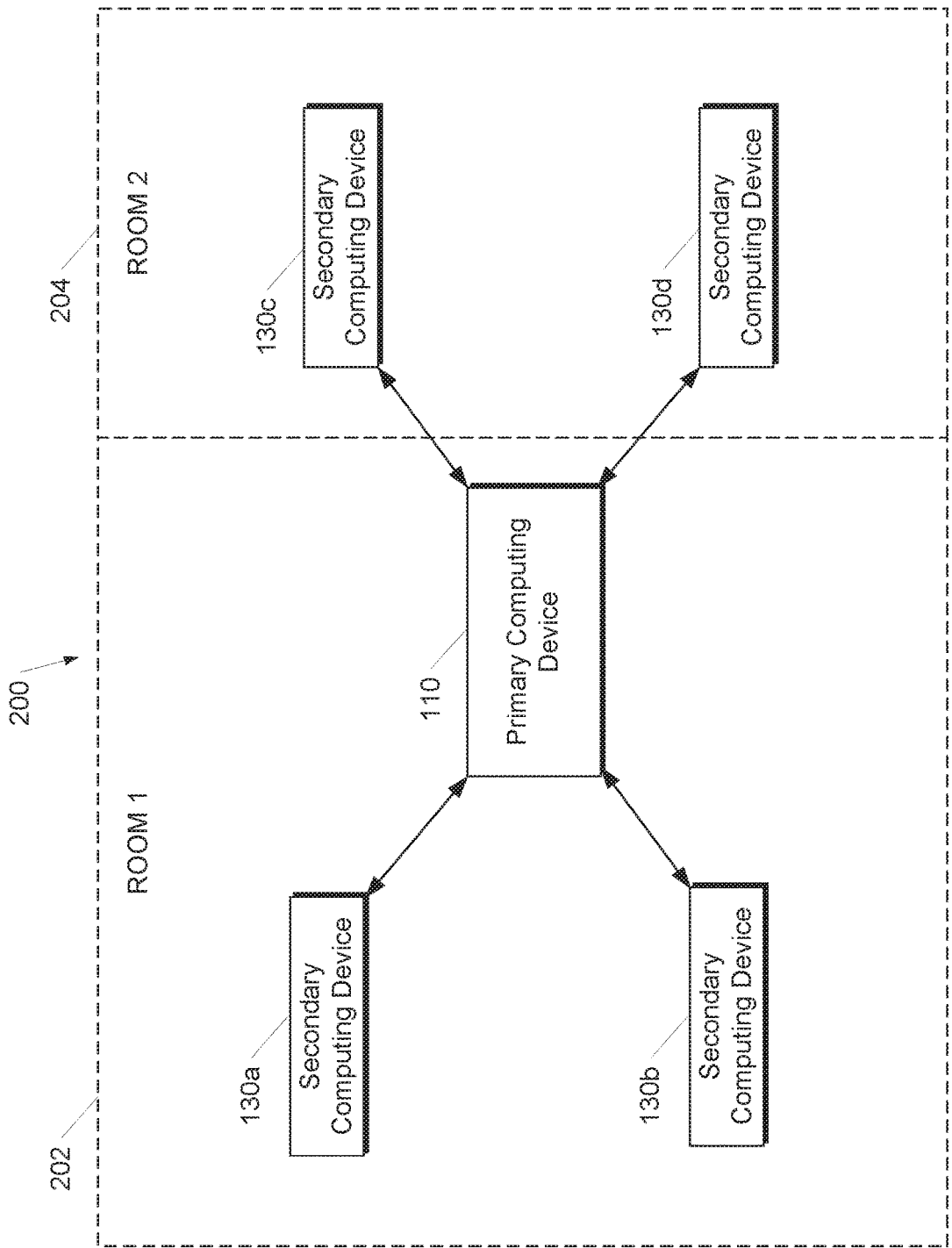
FIG. 2 depicts a block diagram of an example system of networked computing devices according to example embodiments of the present disclosure.

With more particular reference to FIG. 2, computing devices operating over a local area network (e.g., primary computing device 110 and one or more secondary computing devices 130 *a*-130 *d*) can include an application (e.g., a built-in casting application) that provides a user interface for a user to specify a location identifier for each computing device. For example, a user can specify that primary computing device 110 and secondary computing devices 130 *a*, 130 *b* are physically positioned in a first room 202 (e.g., a den), while secondary computing devices 130 *c*, 130 *d* are physically positioned in a second room 204 (e.g., a bedroom). Because location identifiers (e.g., ROOM 1) associated with secondary computing devices 130 *a*, 130 *b* are determined to match a location identifier (e.g., ROOM 1) for the primary computing device 110, then those secondary computing devices 130 *a*, 130 *b* can be determined to be nearby devices. In contrast, because location identifiers (e.g., ROOM 2) associated with secondary computing devices 130 *c*, 130 *d* are determined to be different than location identifier (e.g., ROOM 1) associated with primary computing device 110, then those secondary computing devices 130 *c*, 130 *d* are not determined to be nearby devices. This determination can be advantageous when secondary computing devices 130 *c*, 130 *d* are nearby, but behind a wall between first room 202 and second room 204 and thus not audible by primary computing device 110. In such a situation, it may be desirable to transmit audio control signals requesting that a volume level of audio streams output by secondary computing devices 130 *a*, 130 *b* be reduced to increase the detection accuracy of voice commands at primary computing device 110. A volume level of audio streams output by secondary computing devices 130 *c*, 130 *d* may remain so as not to disturb enjoyment of media by other users located in second room 204.

Referring again to FIG. 1, in some implementations, a nearby device detector 123 can use a grouping configuration to determine which secondary computing devices 130 *a*-130 *d* are nearby devices. Aspects of such configuration can be appreciated from the block diagram of the example system 200 of networked computing devices (e.g., 110, 130 *a-d*).

With more particular reference to FIG. 2, computing devices operating over a local area network (e.g., primary computing device 110 and one or more secondary computing devices 130 *a*-130 *d*) can include an application (e.g., a built-in casting application) that provides a user interface for a user to specify to assign one or more devices into an identified group. For example, a user can specify that multiple devices belonging to one user are assigned to a group entitled "Mark's Devices." For example, first room 202 and second room 204 may correspond to adjacent rooms (e.g., a kitchen and dining room, respectively) that are not separated by a wall. In such instance, it could be desirable to assign all such devices (namely, primary computing device 110 and all secondary computing devices 130 *a*-130 *d*) into a group. Because all secondary computing devices 130 *a*-130 *d* are assigned to the same group as the primary computing device 110, then all secondary computing devices 130 *a*-130 *d* can be determined to be nearby devices.

Referring again to FIG. 1, in some implementations, a nearby device detector 123 can use an audio-based detection configuration to determine which secondary computing devices 130 are nearby devices. In a first audio-based detection configuration, media focus can be used to identify a secondary computing device 130 as a nearby device when a voice command 119 provided to a primary computing device 110 requests for content to be streamed to that secondary computing device 130. For example, if a user 129 provided a voice command 119 to a primary computing device 110 requesting to play video content on a given secondary computing device 130, that secondary computing device 130 can be considered a nearby device.

Additionally or alternatively, a second audio-based detection configuration can use the microphone 126 of a primary computing device 110 to detect nearby devices. Whenever a secondary computing device 130 is playing audio (e.g., via speaker 144/164), the secondary computing device 130 can send some of the audio (e.g., encoded audio stream data associated with the audio) to the primary computing device 110 via network 180. The microphone 126 can be configured to obtain a current audio sample 117 received at the primary computing device 110. The primary computing device 110 determines whether or not it can hear the secondary computing device 130 by comparing the current audio sample 117 to the audio streams currently being played by each secondary computing device 130. When such comparison results in alignment of corresponding audio, then that secondary computing device 130 can be determined to be a nearby device. This approach has an advantage that it only uses the existing playing audio. There are no issues with trying to detect an audio signal from a device that is turned off, and there is no need to correct for different volume levels across devices.

More particularly, in some implementations, a nearby device detector 123 can use a signaling configuration to determine which secondary computing devices 130 are nearby devices. For example, categorizing a secondary computing device 130 as a nearby device can include determining that a remote signal (e.g., an audio signal containing a device-specific code identifying the secondary computing device 130) is received by the primary computing device 110. For example, when a secondary computing device 130 is playing audio content, it can also be configured to periodically (e.g., once every 30 seconds) send a remote signal (e.g., a Dual-Tone Multi-Frequency (DTMF) signal) containing a device-specific code. In some implementations, the device-specific code can be generated from the device's IP address. The primary computing device 110 can then listen for the remote signals in the current audio samples obtained by its microphone 126. If the remote signal associated with a given secondary computing device 130 is detected, that secondary computing device 130 can be categorized as a nearby device. A remote signal can use different signaling protocols, for example, a Bluetooth Low Energy (BLE) protocol, a Direct-Sequence Spread Spectrum (DSSS) protocol, a Binary Phase-Shift Keying (BPSK) protocol, or other short-range wireless protocol can be used in accordance with the signaling configuration for determining nearby devices. This option would be helpful, especially when secondary computing devices 130 are not currently streaming audio content.

There are several advantages to the signaling configuration approach described above. For example, there is an advantageous correlation between the disclosed signaling configuration and audio detection configuration techniques for determining nearby devices. More particularly, if a device-specific remote audio signal is output by a given secondary computing device 130 at a volume proportional to the actual audio volume, detection of the device-specific remote audio signal by a primary computing device 110 likely infers that the actual audio output is also detectable by the primary computing device 110. The approach of using a signaling configuration approach also generally requires little computational cost. In addition, the remote signal advantageously includes a built-in identifier for each secondary computing device 130 from which a device-specific remote signal is received.

In accordance with another aspect of the disclosed technology, a nearby device audio duck controller 124 within an audio control system 120 of a primary computing device 110 can be configured to control a reduction in volume, stopping and/or pausing of audio playback by one or more nearby devices (e.g., secondary computing devices 130). For example a primary computing device 110 can be configured to transmit an audio control signal (e.g., an audio ducking signal) to nearby device(s) 130 that configures the nearby device(s) 130 to reduce a volume level associated with audio streams generated by the nearby device(s) 130 while the primary computing device 110 is operating in a voice-interaction mode. In some implementations, the audio ducking signal is sent to one or more nearby devices 130 upon a primary computing device 110 ducking its own audio streams by reducing a volume, stopping or pausing such audio streams via on-device audio controller 122.

In some implementations, e.g., when an audio ducking signal commands a nearby device 130 to reduce a volume level associated with current audio play, an output volume of each nearby device 130 can be reduced by a predetermined amount (e.g., 30 dB). In some implementations, audio ducking signals can control nearby devices 130 to reduce their respective volume levels by variable amounts based on a current volume for each nearby device 130 as detected by a microphone 126 of the primary computing device 110. In some implementations, audio ducking signals can specify particular ducking actions based on an application running at each nearby device 130 (e.g., pause video content streaming from a video-sharing application, reduce volume level of audio content streaming from an audio-sharing application, etc.).

In some implementations, the nearby device audio duck controller 124 can be further configured to transmit another audio control signal (e.g., an audio unducking signal) to nearby device(s) 130 that configure the nearby device(s) 130 to return to a previous volume level or to resume playback of audio/video content after the primary computing device 110 is finished operating in the voice-interaction mode. In some implementations, the audio unducking signal is sent to one or more nearby devices 130 upon a primary computing device 110 unducking its own audio streams by returning audio/video to a previous volume or resuming playback of audio/video content at the primary computing device 110 (e.g., via on-device audio controller 122).

In some implementations, audio ducking signals and/or audio unducking signals communicated via nearby device audio duck controller 124 by a primary computing device 110 to a secondary computing device 130 can include an identifier associated with the primary computing device 110. When a secondary computing device 130 receives a ducking signal, it can add it to a map of currently active duck requests keyed by each requesting device's identifier. When the same secondary computing device 130 receives an unducking signal, it can remove the corresponding ducked device from the map. As long as there is one or more active ducking signals, the receiving computing device will remain ducked.

In some implementations, a ducking signal can only remain on a map for a predetermined timeout period (e.g., t=5 seconds) before automatically timing out and dropping off the map of currently active duck requests. This helps a secondary computing device 130 from staying in a ducked configuration even after dropping off a network 180 of associated devices. When audio ducking signals are configured to time out at a nearby device, it may be desirable to periodically transmit an audio ducking signal from a primary computing device 110 to a secondary computing device 130. For instance, an audio ducking signal can be periodically transmitted at intervals of time dependent on the predetermined timeout period (e.g., t/2, or 2.5 seconds when t=5 seconds as in the above example).

In accordance with another aspect of the disclosed technology, a nearby device audio erase controller 125 within an audio control system 120 of a primary computing device 110 can be configured to control modification of a current audio sample to reduce a portion of the current audio sample corresponding to the current audio streams generated for audible output by each of the one or more nearby secondary computing devices 130. For example, when a primary computing device 110 sets up a persistent control connection to a nearby device 130 (for ducking), it can also request streamed audio data from that nearby device 130. Once this is done, whenever the nearby device 130 is playing audio, it can be configured to transmit audio stream data associated with the audio to the primary computing device 110. This enables the primary computing device 110 to erase the nearby device's audio from its microphone input.

In some implementations, to facilitate audio erasing, a primary computing device 110 can also obtain a timestamp associated with the current audio streams generated for audible output by each of the one or more secondary computing devices 130. In some implementations, each audio packet sent from a secondary computing device 130 to a primary computing device 110 includes such a timestamp. A clock offset between a system clock associated with the primary computing device 110 and system clocks associated with each of the one or more secondary computing devices 130 can be determined using the obtained timestamp(s). The clock offset can be used at least in part to compare and/or align the current audio streams generated for audio output by each of the one or more secondary computing devices 130 to the current audio sample received by the microphone of the primary computing device. The clock offset can be used, for example, in determining an alignment window for comparing audio from secondary computing devices 130 relative to a primary computing device 110. Determination of an alignment window can be especially useful when timestamps include inaccuracies due to hardware output delays or other phenomena.

Nearby device audio streams can be erased from a current audio sample to facilitate hotword detection and/or to improve operation during voice-interaction mode after hotword detection. More particularly, in some implementations, modifying a current audio sample is implemented before initiating voice-interaction mode for operating a primary computing device 110 such that the current audio sample has a reduced audio contribution from each nearby device 130 before being analyzed for detection of a predetermined mode initiation command. In other implementations, modifying a current audio sample is implemented after initiating voice-interaction mode for operating the primary computing device 110 such that the current audio sample has a reduced audio contribution from each nearby device before being analyzed to determine voice commands from a user while operating in the voice-interaction mode.

Audio stream data relayed from a nearby device 130 to a primary computing device 110 can include the same file format or a different file format relative to the audio file played at the nearby device 130. For example, audio stream data can include a copy of decrypted data for play by the nearby device, an encoded/encrypted version of the audio stream (e.g., MP3 data, UDP data packets, data encoded using an audio codec such as PCM, Opus, etc.) Sending encoded data between devices can sometimes advantageously reduce the bandwidth of communicated audio stream data required to implement the disclosed audio erasing techniques.

In some implementations, the nearby device audio erase controller 125 can align the audio streams being currently played by nearby devices 130 with a current audio sample obtained at the microphone 126 of a primary computing device 110. In some implementations, initial alignment of each audio stream can be configured to run on a low priority processing thread so as not to negatively affect other tasks. If an initial alignment fails, the nearby device audio erase controller 125 can skip ahead in the audio stream and try again a few seconds later, potentially implementing an exponential backoff. In some implementations, to save bandwidth, each nearby device 130 can send only short segments of audio stream data with which to align until alignment actually succeeds.

In some implementations, the nearby device audio erase controller 125 can also erase audio contributed from the primary computing device itself 110. In such instance, the one or more secondary computing devices include the primary computing device 110 such that modifying a current audio sample 117 reduces the portion of the current audio sample corresponding to the current audio stream generated for audible output by the primary computing device 110.

In some implementations, the nearby device audio erase controller 125 can implement additional coordination when multiple nearby devices 130 are operating relative to a primary computing device 110. Such additional coordination can help address potential issues associated with bandwidth requirements for all audio streams from multiple such nearby devices 130. For example, if there are many nearby devices 130 playing (or, many voice assistants near a single playing device), there will be many audio streams being sent over a network 180. In addition, erasing many different streams can burden the processing capacity of the primary computing device 110.

In some implementations, potential bandwidth issues can be mitigated by identifying when group casting by multiple nearby devices 130 including a leader device and one or more follower devices is being implemented (e.g., in a multi-room playback application). In such applications, the nearby device audio erase controller 125 can then request audio stream data from only the leader device. Additionally or alternatively, if there are many non-grouped nearby devices 130 playing audio content, the primary computing device 110 can prioritize erasing audio streams from the loudest device(s), and not request audio from the other devices. This can be done by initially requesting data from all devices, and determining the effective loudness, either from the ultrasonic checking at different volume levels, or by checking how much effect erasing each stream has on the current audio sample obtained by a microphone of the primary computing device. Nearby devices 130 whose audio streams don't have much effect could then be ignored.

Figure 3:
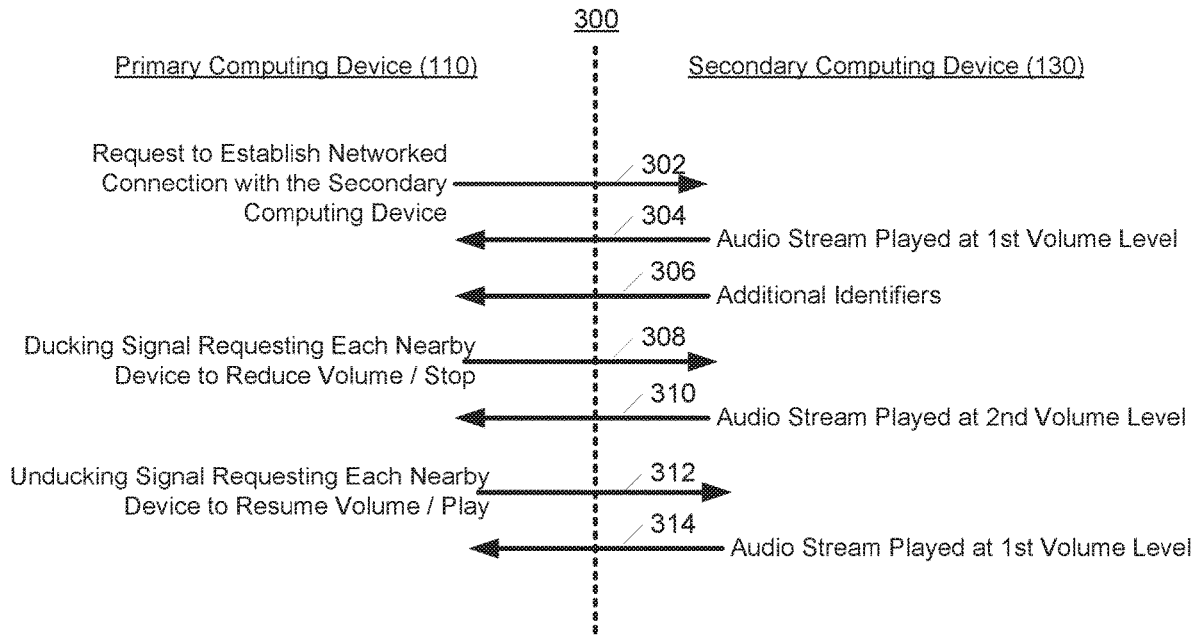
FIG. 3 depicts a communication schematic for implementing audio ducking according to example embodiments of the present disclosure.

Referring now to FIG. 3, a communication schematic 300 for implementing audio ducking according to example embodiments of the present disclosure is depicted. Communications schematic 300 includes different signaling that may occur between a primary communication device 110 and a secondary communication device 130 to implement audio ducking. For example, signal 302 communicated from primary computing device 110 to secondary computing device 130 can include a request to establish networked connection with the secondary computing device 130.

Signal 304 communicated from secondary computing device 130 to primary computing device 110 can include an audio stream being currently played by the secondary computing device. The audio stream represented at signal 304 can be played at a first volume level that is audibly detected by a microphone of the primary computing device 110.

Signal 306 communicated from secondary computing device 130 to primary computing device 110 can include additional identifiers that can be used alone or in addition to the audio stream signal 304 to determine whether secondary device 130 should be considered a nearby device. Additional identifiers 306 can include, for example, location identifiers, grouping identifiers, device-specific identifiers transmitted via a short-range audible or inaudible wireless protocol, and the like.

When secondary device 130 is determined to be a nearby device and when primary computing device 110 is operating in a voice-interaction mode, a signal 308 can be communicated from primary computing device 110 to secondary computing device 130 corresponding to an audio control signal (e.g., a ducking signal) requesting that the secondary computing device 130 reduce a volume level associated with its current audio stream, stop a current audio stream, pause a current audio stream, etc.

In response to receipt of the audio control signal 308, signal 310 communicated from secondary computing device 130 to primary computing device 110 can include an audio stream being currently played by the secondary computing device. The audio stream represented at signal 310 can be played at a second volume level that is audibly detected by a microphone of the primary computing device 110. The second volume level of audio stream signal 310 can be less than the first volume level of audio stream signal 304.

After a primary computing device 110 is finished operating in a voice-interaction mode, a signal 312 can be communicated from primary computing device 110 to secondary computing device 130 corresponding to an audio control signal (e.g., an unducking signal) requesting that the secondary computing device 130 resume playback of stopped or paused audio or adjust the volume level of played audio.

In response to receipt of the audio control signal 312, signal 314 communicated from secondary computing device 130 to primary computing device 110 can include an audio stream played by the secondary computing device. The audio stream represented at signal 314 can be played at the first volume level such as that associated with audio stream signal 304 or another volume level that is higher than the second volume level of audio stream signal 310.

Figure 4:
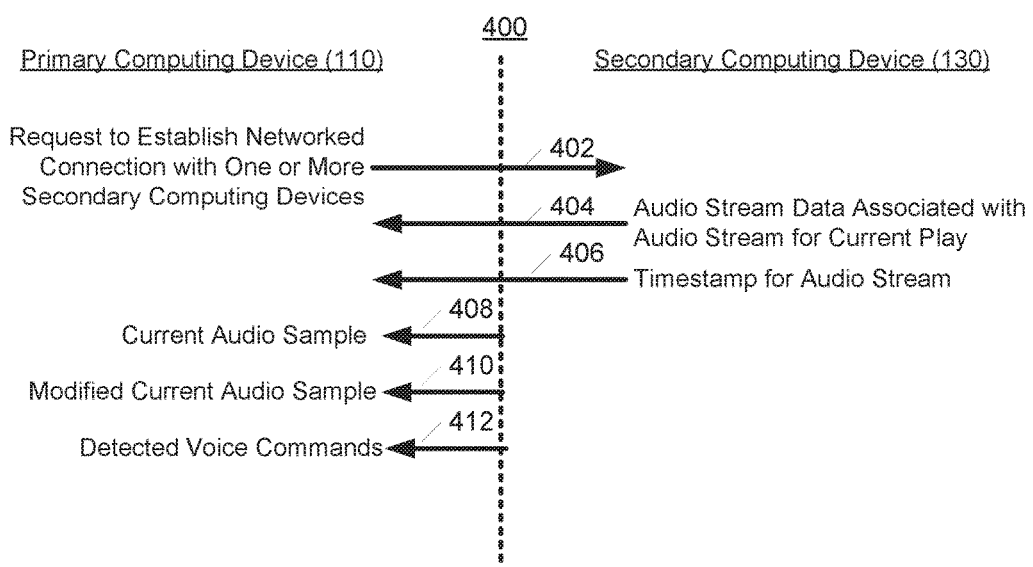
FIG. 4 depicts a communication schematic for implementing audio erasing according to example embodiments of the present disclosure.

Referring now to FIG. 4, a communication schematic 400 for implementing audio erasing according to example embodiments of the present disclosure is depicted. Communications schematic 400 includes different signaling that may occur between a primary communication device 110 and a secondary communication device 130 to implement audio erasing. For example, signal 402 communicated from primary computing device 110 to secondary computing device 130 can include a request to establish networked connection with the secondary computing device 130.

Signal 404 communicated from secondary computing device 130 to primary computing device 110 can include audio stream data (e.g., an encoded representation) associated with an audio stream that is currently played at secondary computing device 130.

Signal 406 communicated from secondary computing device 130 to primary computing device 110 can include a separate signal from signal 404 or can be a part of signal 404 that includes a timestamp for each portion of audio stream data relayed via signal 402.

A current audio sample signal 408 may also be obtained by a primary computing device 110 (e.g., via a microphone of primary computing device 110). The current audio sample signal 408 can be processed in conjunction with the audio stream data and associated timestamps within signals 404 and 406 to create a modified current audio sample signal 410. The modified current audio sample signal 410 can correspond to the current audio sample signal 408 with background noise contributed by audio streams from the secondary computing device 130 subtracted out. Voice command signals 412 can then be more easily detected within periodically determined snippets of a modified current audio sample signal 410.

Example Methods

Figure 5:
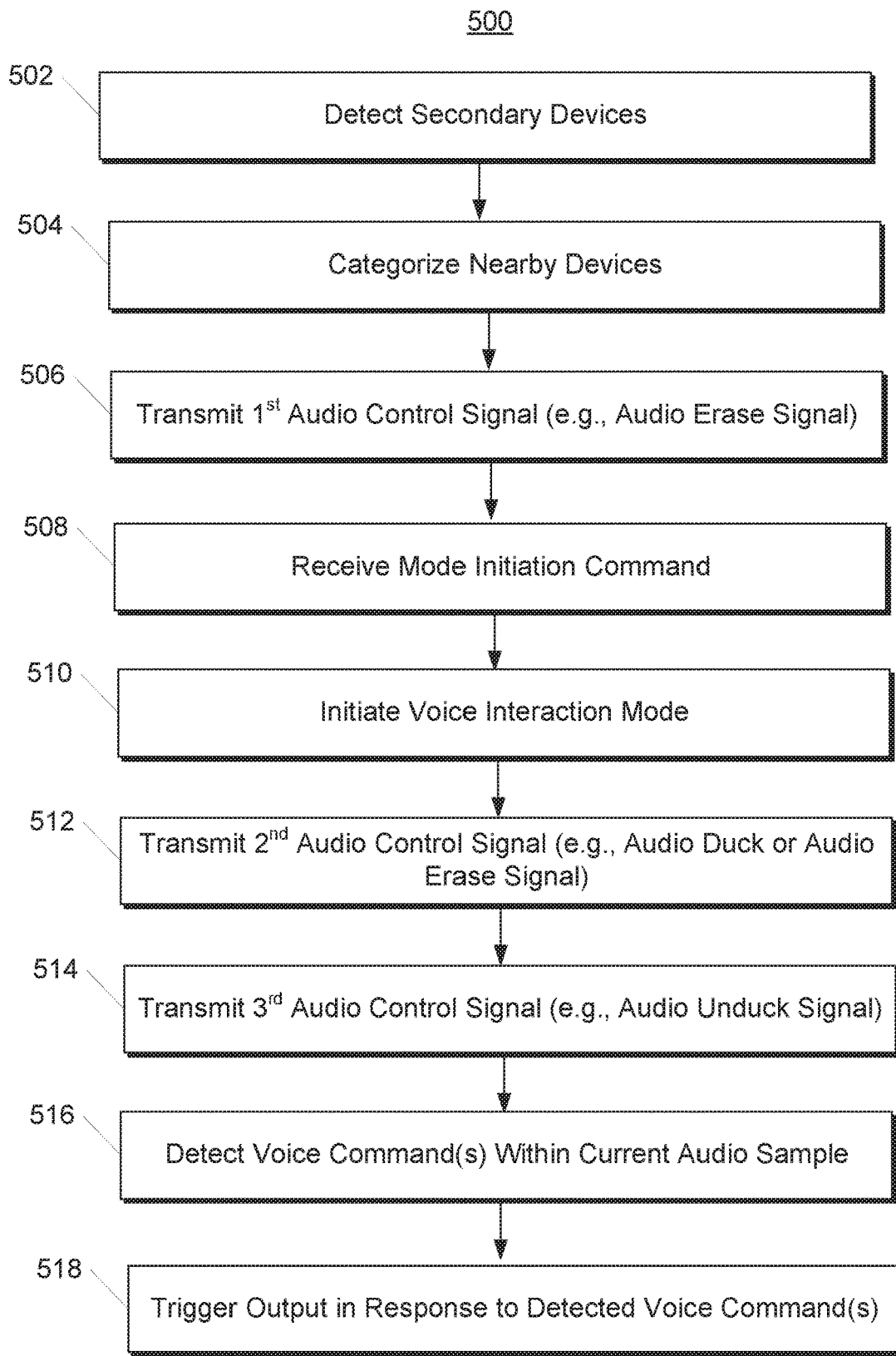
FIG. 5 depicts a flowchart of a first example method according to example embodiments of the present disclosure.

FIG. 5 depicts a flow chart of an example method 500 to control audio among networked devices according to example embodiments of the present disclosure.

At 502, a primary computing device can detect one or more secondary computing devices configured to generate audio streams for audible output in an environment. The primary computing device and the one or more secondary computing devices can be communicatively coupled via a network (e.g., a local network) and can sometimes include a casting platform such that audio/video content can be streamed from one device to another.

At 504, a primary computing device can categorize secondary computing devices detected at 502 by determining a subset of the secondary computing devices that are considered nearby devices. In some implementations, a device is considered to be nearby when the device is determined to be capable of providing audio streams that are audibly detected by the primary computing device.

More particularly, in some embodiments, categorizing secondary computing devices at 504 as nearby devices can include determining that a location identifier associated with the one or more secondary computing devices matches a location identifier associated with the primary computing device.

More particularly, in some embodiments, categorizing secondary computing devices at 504 as nearby devices can include obtaining, by the primary computing device via the network, audio stream data associated with current audio streams generated for audible output by each of the one or more secondary computing devices. A current audio sample received by a microphone of the primary computing device can also be obtained. The current audio streams generated for audible output by each of the one or more secondary computing devices can be compared to the current audio sample received at the primary computing device to determine if alignment is possible.

More particularly, in some embodiments, categorizing secondary computing devices at 504 as nearby devices can include determining that a remote signal from each of the one or more secondary computing devices is received by the primary computing device. In some implementations, such a remote signal comprises an audio signal containing a device-specific code identifying the corresponding secondary computing device sending the remote signal.

At 506, a primary computing device can transmit a first audio control signal to one or more nearby devices determined at 504. For example, the first audio control signal transmitted at 506 can include an audio erase signal requesting audio stream data from each nearby device as well as associated timestamps. In this manner, audio erasing of audio streams can be facilitated within a current audio sample obtained by a primary computing device to improve hotword detection.

At 508, a primary computing device can receive a current audio sample that is determined to include a voice command that matches a predetermined mode initiation command (e.g., "OK, smart device.")

At 510, a primary computing device can initiate a voice-interaction mode for operating the primary computing device to receive voice commands from a user and provide audio output in response to the voice commands. Initiation of the voice-interaction mode at 510 can be implemented in response to receiving the voice command that is determined to match the mode initiation command at 508.

At 512, a primary computing device can transmit a second audio control signal (e.g., an audio ducking signal and/or an audio erase signal). In some implementations, an audio control signal (e.g., an audio ducking signal) is transmitted to one or more nearby devices at 512. The audio control signal configures each nearby device to reduce a volume level associated with the audio stream generated by the nearby device while the primary computing device is operating in the voice-interaction mode. In some implementations, transmitting such an audio ducking signal at 512 can be implemented as part of also reducing a primary computing device ducking its own audio by reducing a volume level associated with audio output by the primary computing device. In some implementations, an audio control signal (e.g., an audio erase signal) is transmitted to one or more nearby devices at 512 and configures each nearby device to transmit, to the primary computing device, audio stream data associated with a current audio stream generated for audible output by each nearby computing device. This audio stream data can then be used to modify current audio samples, as further described in FIG. 6.

At 514, a primary computing device can transmit a third audio control signal from the primary computing device to each nearby device. For example, when the second audio control signal sent at 512 includes an audio ducking signal, the third audio control signal sent at 514 can include an audio unducking signal that configures the nearby devices to return to a previous volume level after the primary computing device is finished operating in the voice-interaction mode.

At 516, a primary computing device can detect voice commands within a current audio sample obtained by a microphone of the primary computing device. At 518, a primary computing device can trigger one or more outputs in response to the voice commands detected at 516. Outputs triggered at 518 can include, for example, illumination of a lighting component, activation of an audible sound, streaming audio/video content, providing an audible answer to a question posed within the detected voice command, setting a timer, etc.

Figure 6:
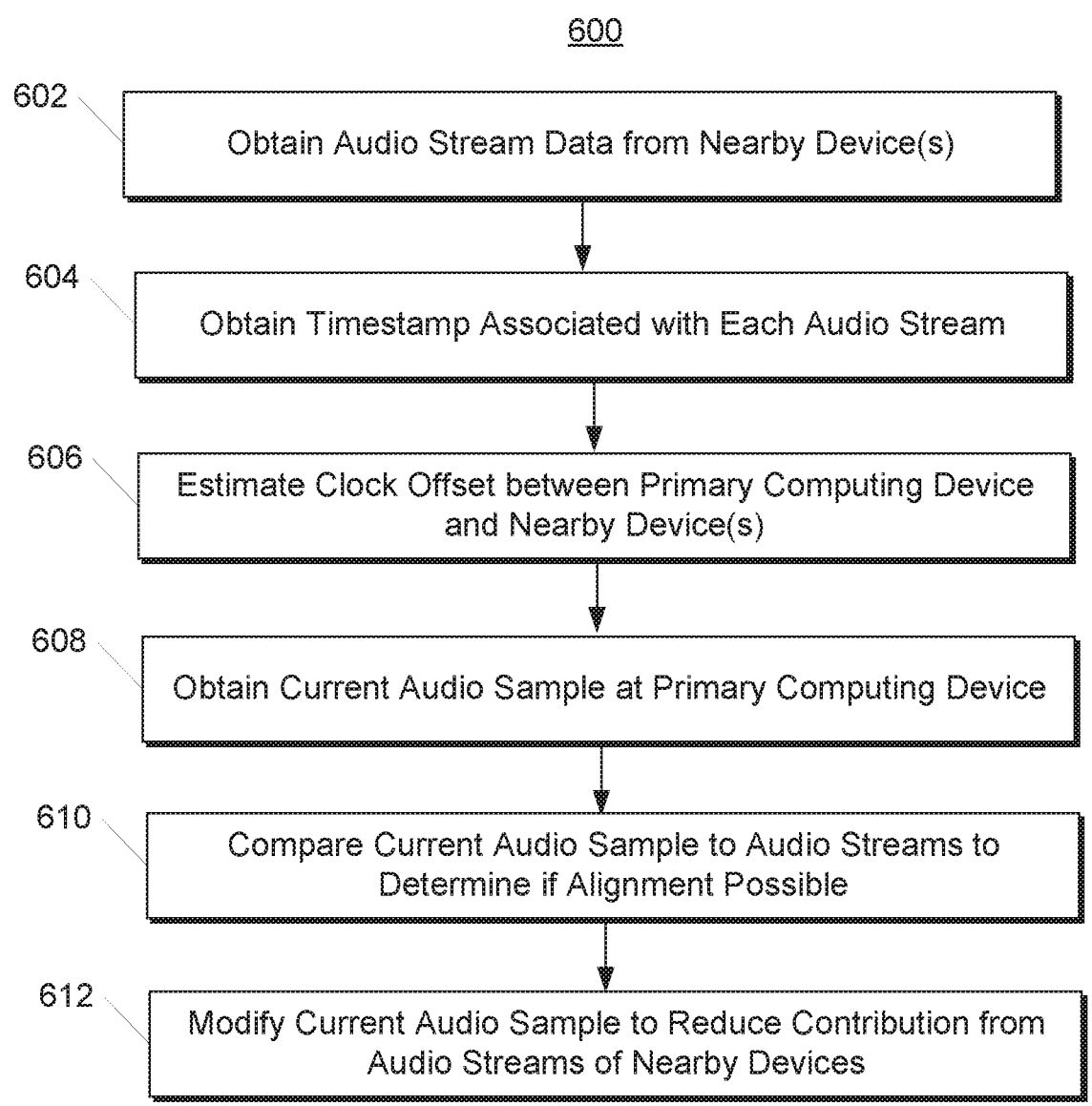
FIG. 6 depicts a flowchart of a second example method according to example embodiments of the present disclosure.

FIG. 6 depicts a flow chart of an example method 600 to implement aspects of audio erasing according to example embodiments of the present disclosure.

At 602, a primary computing system can obtain via a network audio stream data from nearby devices. The audio stream data obtained at 602 can be associated with current audio streams generated for audible output by each of the one or more secondary computing devices. At 604, a primary computing device can obtain timestamp information associated with each audio stream obtained at 602.

At 606, a primary computing device can estimate clock offset between a system clock associated with the primary computing device and system clocks associated with each of the one or more secondary computing devices from which an audio sample is obtained at 602 and a corresponding timestamp is obtained at 604.

At 608, a primary computing device can obtain a current audio sample via a microphone at a primary computing device.

At 610, the current audio sample obtained at 608 can be compared to the respective audio streams being played at each nearby device to determine if alignment is possible between each pair of audio sample and audio stream pair. In some implementations, the comparison at 610 can be facilitated in part by the clock offset value(s) estimated at 606.

At 612, a primary computing device can modify a current audio sample obtained at 608 to reduce a portion of the current audio sample corresponding to the current audio streams generated for audible output by each of the one or more secondary computing devices. In some implementations, modifying the current audio sample at 612 is implemented before initiating a voice-interaction mode for operating the primary computing device (e.g., as initiated at 510 in FIG. 5) such that the current audio sample has a reduced audio contribution from each nearby device before being analyzed for detection of a predetermined mode initiation command. In some implementations, modifying the current audio sample at 612 is implemented after initiating a voice-interaction mode for operating the primary computing device (e.g., as initiated at 510 in FIG. 5) such that the current audio sample has a reduced audio contribution from each nearby device before being analyzed to determine voice commands from a user while operating in the voice-interaction mode.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

In particular, although FIGS. 3-6 respectively depict steps performed in a particular order for purposes of illustration and discussion, the methods of the present disclosure are not limited to the particularly illustrated order or arrangement. The various steps of the methods 300, 400, 500, and 600 can be omitted, rearranged, combined, and/or adapted in various ways without deviating from the scope of the present disclosure.

What is claimed is:

1. A computer-implemented method in a primary computing device, the computer-implemented method comprising:

obtaining, by a processor of the primary computing device from a secondary computing device via a network connection, audio stream data associated with a current audio stream generated for audible output by the secondary computing device;

receiving, by the processor, a current audio sample detected by a microphone of the primary computing device, the current audio sample comprising audible audio output by the secondary computing device;

modifying, by the processor, the current audio sample by performing an acoustic echo cancellation on the current audio sample to reduce at least a portion of the audible audio output corresponding to the audio stream data obtained by the processor;

detecting, by the processor within the current audio sample that was modified, at least one voice command; and triggering an output of the primary computing device based on detecting the at least one voice command within the current audio sample that was modified.

2. The computer-implemented method of claim 1, further comprising:

obtaining a timestamp associated with the current audio stream generated for audible output by the secondary computing device; and estimating, using the timestamp, a clock offset between a system clock associated with the primary computing device and a system clock associated with the secondary computing device;

and wherein modifying the current audio sample comprises:

modifying, by the processor, the current audio sample using the clock offset.

3. The computer-implemented method of claim 1, wherein detecting the at least one voice command comprises detecting, by the processor within the current audio sample that was modified, a keyword associated with a predetermined mode initiation command; and wherein triggering the output comprises activating a lighting component of the primary computing device.

4. The computer-implemented method of claim 3, further comprising:
based on detecting the keyword associated with the predetermined mode initiation command, initiating a voice-interaction mode for operating the primary computing device to receive a set of additional voice commands from a user.

5. The computer-implemented method of claim 4, further comprising:
based on initiating the voice-interaction mode, transmitting, by the processor to the secondary computing device, an audio control signal to cause the secondary computing device to reduce a volume level associated with the current audio stream.

6. The computer-implemented method of claim 1, wherein triggering the output comprises:
outputting, by the primary computing device, an audio output corresponding to the at least one voice command.

7. A primary computing device, comprising:
a communications interface for communicating with a secondary computing device;
a microphone; and
a processor interfaced with the communication component and the microphone, and configured to:
obtain, from a secondary computing device via the communications interface, audio stream data associated with a current audio stream generated for audible output by the secondary computing device,
receive, from the microphone, a current audio sample detected by the microphone, the current audio sample comprising audible audio output by the secondary computing device,
modify the current audio sample by performing an acoustic echo cancellation on the current audio sample to reduce at least a portion of the audible audio output corresponding to the audio stream data,
detect, within the current audio sample that was modified, at least one voice command, and
trigger an output of the primary computing device based on detecting the at least one voice command within the current audio sample that was modified.

8. The primary computing device of claim 7, wherein the processor is further configured to:
obtain a timestamp associated with the current audio stream generated for audible output by the secondary computing device, and
estimate, using the timestamp, a clock offset between a system clock associated with the primary computing device and a system clock associated with the secondary computing device;
and wherein the processor uses the clock offset of modify the current audio sample.

9. The primary computing device of claim 7, further comprising:
a lighting component;
wherein the processor detects the at least one voice command by detecting, within the current audio sample that was modified, a keyword associated with a predetermined mode initiation command; and
wherein the processor triggers the output by activating the lighting component.

10. The primary computing device of claim 9, wherein the processor is further configured to:
based on detecting the keyword associated with the predetermined mode initiation command, initiate a voice-interaction mode for operating the primary computing device to receive a set of additional voice commands from a user.

11. The primary computing device of claim 10, wherein the processor is further configured to:
based on initiating the voice-interaction mode, transmit, to the secondary computing device via the communications interface, an audio control signal to cause the secondary computing device to reduce a volume level associated with the current audio stream.

12. The primary computing device of claim 7, further comprising:
a speaker;
wherein to trigger the output, the processor is configured to:
cause the speaker to output an audio output corresponding to the at least one voice command.

13. A system for managing audio output, comprising:
a secondary computing device configured to:
audibly output a current audio stream, and
communicate with a primary computing device via a communications interface; and
the primary computing device configured to:
receive, from the secondary computing device via the communications interface, audio stream data associated with the current audio stream audibly output by the secondary computing device,
receive a current audio sample detected by a microphone of the primary computing device, the current audio sample comprising audible audio output by the secondary computing device,
modify the current audio sample by performing an acoustic echo cancellation on the current audio sample to reduce at least a portion of the audible audio output corresponding to the audio stream data,
detect, within the current audio sample that was modified, at least one voice command, and
trigger an output of the primary computing device based on detecting the at least one voice command within the current audio sample that was modified.

14. The system of claim 13, wherein the primary computing device is further configured to:
obtain a timestamp associated with the current audio stream audibly output by the secondary computing device, and
estimate, using the timestamp, a clock offset between a system clock associated with the primary computing device and a system clock associated with the secondary computing device;
and wherein the processor uses the clock offset of modify the current audio sample.

15. The system of claim 13, wherein the primary computing device is further configured to:
initiate a voice-interaction mode for operating the primary computing device to receive a set of additional voice commands from a user.

16. The system of claim 15, wherein the primary computing device is further configured to:
based on initiating the voice-interaction mode, transmit, to the secondary computing device via the communications interface, an audio control signal;
wherein the secondary computing device is further configured to:

based on the audio control signal, reduce a volume level associated with the current audio stream being audibly output.

17. The system of claim 13, wherein to trigger the output, the primary computing device is configured to:
output, via a speaker, an audio output corresponding to the at least one voice command.

\* \* \* \* \*